(12) United States Patent
Brown

(10) Patent No.: US 10,583,725 B1
(45) Date of Patent: Mar. 10, 2020

(54) VEHICLE WIND DEFLECTOR ASSEMBLY

(71) Applicant: Nissan North America, Inc., Franklin, TN (US)

(72) Inventor: Joseph Brown, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/146,148

(22) Filed: Sep. 28, 2018

(51) Int. Cl.
*B60J 7/22* (2006.01)

(52) U.S. Cl.
CPC ........................................ *B60J 7/22* (2013.01)

(58) Field of Classification Search
CPC ............................................................ B60J 7/22
USPC ............................................................ 296/217
See application file for complete search history.

(56) References Cited

U.S. PATENT DOCUMENTS

| | | | |
|---|---|---|---|
| 4,480,869 A | 11/1984 | Splithoff | |
| 4,738,483 A * | 4/1988 | Boots | B60J 7/22 16/63 |
| 4,986,598 A | 1/1991 | Yamauchi et al. | |
| 6,626,486 B2 * | 9/2003 | Lane | B60J 7/22 296/217 |
| 6,910,733 B2 | 6/2005 | Raasakka | |
| 6,966,603 B2 | 11/2005 | Grimm et al. | |
| 7,025,413 B2 * | 4/2006 | Czechtizky | B60J 7/22 296/217 |
| 7,093,892 B2 * | 8/2006 | Karami | B60J 7/22 296/217 |
| 8,191,962 B2 * | 6/2012 | Katayama | B60J 7/22 296/217 |
| 8,662,577 B2 * | 3/2014 | Wimmer | B60J 7/22 296/217 |
| 9,102,219 B2 | 8/2015 | Czechtizky | |
| 9,586,464 B2 | 3/2017 | Sinha et al. | |
| 2008/0246306 A1 | 10/2008 | Oerke et al. | |
| 2009/0309393 A1 | 12/2009 | Pihale et al. | |
| 2010/0283294 A1 * | 11/2010 | Gundogdu | B60J 7/22 296/217 |
| 2013/0193721 A1 | 8/2013 | Wimmer | |
| 2017/0182870 A1 * | 6/2017 | Takahashi | B60J 7/22 |
| 2018/0326828 A1 * | 11/2018 | Shoji | B60J 7/22 |

FOREIGN PATENT DOCUMENTS

| | | | | |
|---|---|---|---|---|
| DE | 10232913 | * | 2/2004 | ............... B60J 7/22 |
| DE | 102005054187 B4 | | 8/2008 | |
| EP | 1281556 A1 | | 2/2003 | |
| EP | 1380458 | * | 7/2003 | ............... B60J 7/22 |
| FR | 2845038 A1 | | 4/2004 | |
| WO | WO2008031428 | * | 3/2008 | |

OTHER PUBLICATIONS

International Search Report and Written Opinion in PCT/US2019/022430 dated Jun. 10, 2019.

\* cited by examiner

*Primary Examiner* — Dennis H Pedder
(74) *Attorney, Agent, or Firm* — Global IP Counselors, LLP

(57) ABSTRACT

A vehicle wind deflector assembly includes a wind deflector and a tether. The tether has a deflector attachment part, a frame attachment part and a connecting line. The deflector attachment part is attached to the wind deflector. The frame attachment part is configured to be attached to a vehicle roof component. The connecting line is disposed between the frame attachment part and the deflector attachment part.

19 Claims, 9 Drawing Sheets

US 10,583,725 B1

VEHICLE WIND DEFLECTOR ASSEMBLY

BACKGROUND

Field of the Invention

The present invention generally relates to vehicle wind deflector assembly. More specifically, the present invention relates to vehicle wind deflector assembly have a tether to be connected to a vehicle wind deflector.

Background Information

Vehicles having open sunroof(s) or moonroof(s) may encounter the problem of increased aerodynamic drag and wind noise in the passenger compartment through the sunroof or moonroof. Thus, wind deflectors are provided to sunroofs and sunroof mechanisms. A wind deflector that is used for a sunroof is disposed at a vehicle forward end of an opening in a roof so as to reduce aerial vibration in the passenger compartment of the vehicle. The wind deflector is mounted on a sunroof and a moveable panel covers an opening in the roof. When the moveable panel moves backward to open the sunroof, the wind deflector is simultaneously raised. The wind deflector is axially supported by the roof so as to be able to rotate.

SUMMARY

It has been discovered that wind deflectors are movably attached to a sunroof frame at a desired height to decrease wind noise.

In view of the state of the known technology, one aspect of the present disclosure is to provide a vehicle wind deflector comprising a wind deflector and a tether. The tether has a deflector attachment part, a frame attachment part and a connecting line. The deflector attachment part is attached to the wind deflector. The frame attachment part is configured to be attached to a vehicle roof component. The connecting line is disposed between the frame attachment part and the deflector attachment part.

In view of the state of the known technology, another aspect of the present disclosure is to provide a vehicle sunroof assembly comprising a vehicle wind deflector assembly and a sunroof frame. The vehicle sunroof assembly comprises a wind deflector and a tether. The tether has a deflector attachment part, a frame attachment part and a connecting line. The deflector attachment part is attached to the wind deflector. The frame attachment part is configured to be attached to a vehicle roof component. The connecting line is disposed between the frame attachment part and the deflector attachment part. The sunroof frame has an opening for a window panel. The wind deflector is moveably installed onto the sunroof frame between a stowed position and a projected position. The tether is attached to the sunroof frame. The tether is retracted when the deflector is in the stowed position. The tether is extended when the deflector is in the projected position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
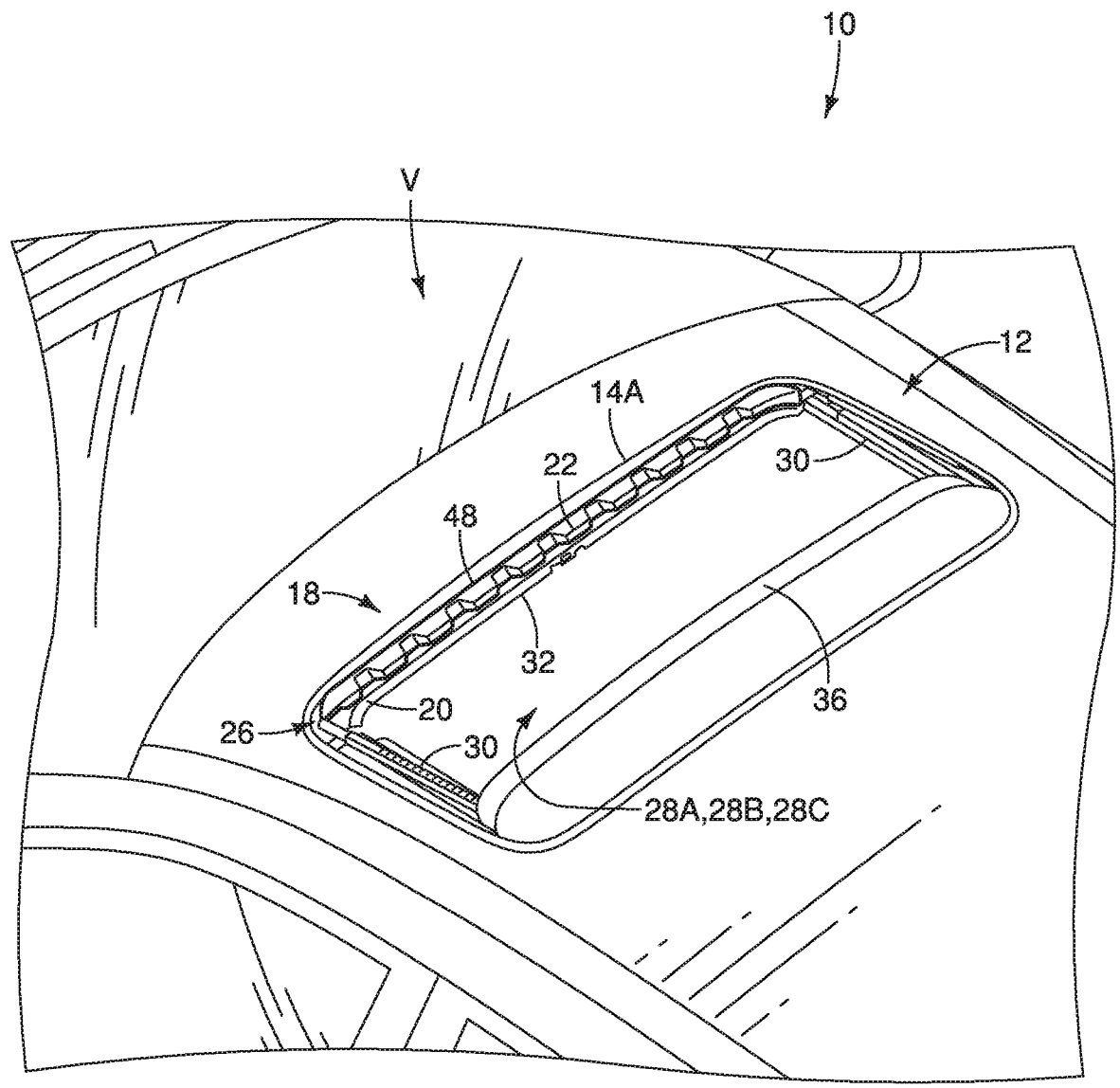
FIG. 1 is a perspective view of a top portion of a vehicle equipped with a vehicle sunroof assembly.
Figure 2:
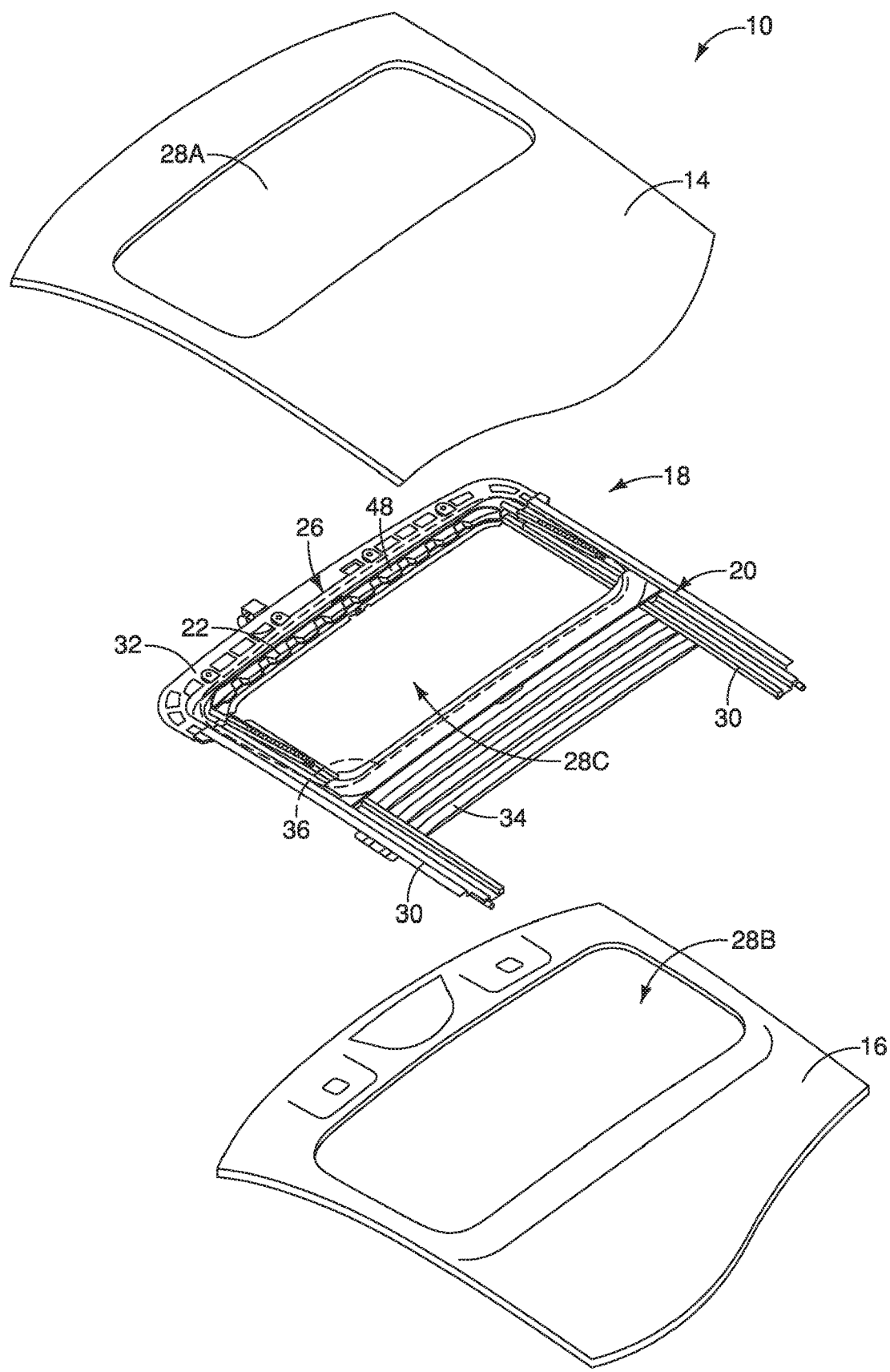
FIG. 2 is an exploded view of the vehicle sunroof assembly illustrated in FIG. 1.
Figure 3:
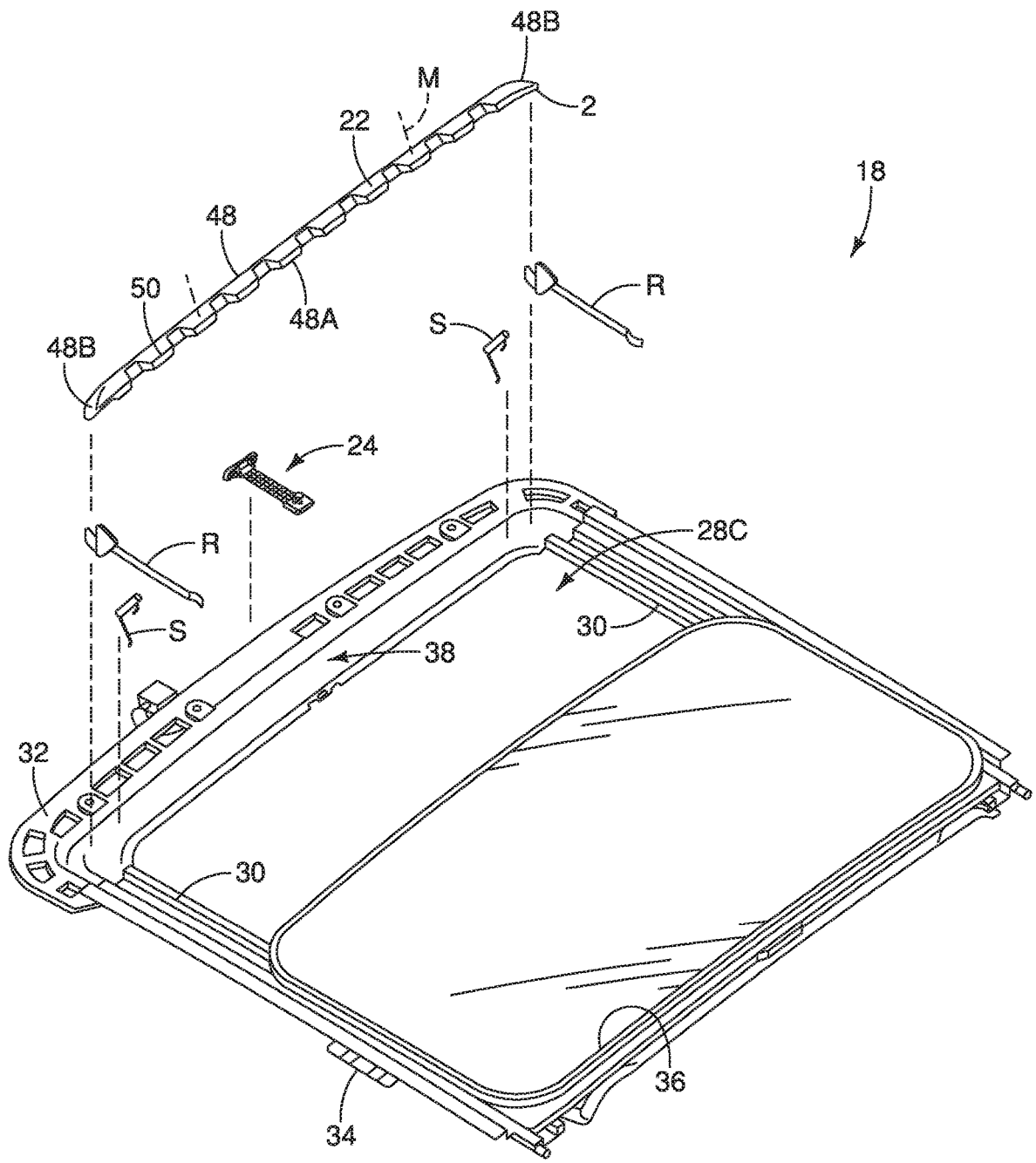
FIG. 3 is a top perspective view of a vehicle wind deflector assembly of the vehicle sunroof assembly shown over a sunroof frame, the vehicle wind deflector assembly being shown in exploded view.

Referring now to FIGS. 1 and 2, a portion of a vehicle V is illustrated having a vehicle roof assembly 10 in accordance with an illustrated embodiment. As seen in FIG. 2, the vehicle roof assembly 10 includes a vehicle roof 14, a roof trim panel 16 and a vehicle sunroof assembly 18. In the illustrated embodiment, the vehicle roof 14 and the roof trim panel 16 are considered vehicle roof components. The vehicle sunroof assembly 18 basically comprises a sunroof S (or moonroof) operable to allow light and/or fresh air to enter the vehicle's passenger compartment. The sunroof S is also considered a moveable window panel that can be glass or shade, as will be discussed below. As seen in FIG. 3, the vehicle sunroof assembly 18 further comprises a sunroof frame 20, a wind deflector 22 and a tether 24. In the illustrated embodiment, the wind deflector 22 and the tether 24 are considered part of a vehicle wind deflector assembly 26 of the vehicle roof assembly 10. In other words, the vehicle wind deflector assembly 26 comprises the wind deflector 22 and the tether 24.

The wind deflector 22 is provided to the vehicle V to reduce in-vehicle airflow through the sunroof S and cuts down wind noises into the vehicle's interior. In particular, the wind deflector 22 is moveably attached to the sunroof frame 20 between a stowed position and a projected position. The tether 24 is provided to attach the wind deflector 22 to the sunroof frame 20 between the stowed and projected positions of the wind deflector 22. In the illustrated embodiment, the tether 24 is retracted when the wind deflector 22 is in the stowed position and the tether 24 is extended when the deflector is in the projected position. As will be further discussed, the tether 24 of the illustrated embodiment is attached to the wind deflector 22 to maintain a desired height of the wind deflector 22 when in the wind deflector 22 is in the projected position. The tether 24 is further provided to reduce vibration of the wind deflector 22 when the wind deflector 22 is in in the projected position. The tether 24 and wind deflector 22 will be further discussed below.

Referring to FIGS. 1 and 2, the vehicle roof 14 is part of a vehicle body structure. The vehicle roof 14 includes a roof opening 28A onto which are installed the sunroof frame 20 and other sunroof structures. The vehicle roof 14 can be made of metal, such as steel or aluminum, or any other suitable material used in vehicle manufacturing processes.

The roof trim panel 16 is a headliner that is secured to the vehicle roof 14 by any suitable type of fasteners in a conventional manner. The roof trim panel 16 forms the roof interior of the vehicle V. In other words, the roof trim panel 16 forms an interior overhead surface within the passenger compartment of the vehicle V. The roof trim panel 16 is made of a composite material that typically consists of a face fabric with nonwoven or foam backing 64A. Typically, the roof trim panel 16 can be integrated with desired light fixtures fixed within one of multiple layers of composite materials. As seen in FIG. 2, the roof trim panel 16 includes an opening 28B that aligns with or substantially aligns with roof opening 28A in the vehicle roof 14 to permit exterior light to enter the passenger compartment.

Figure 4:
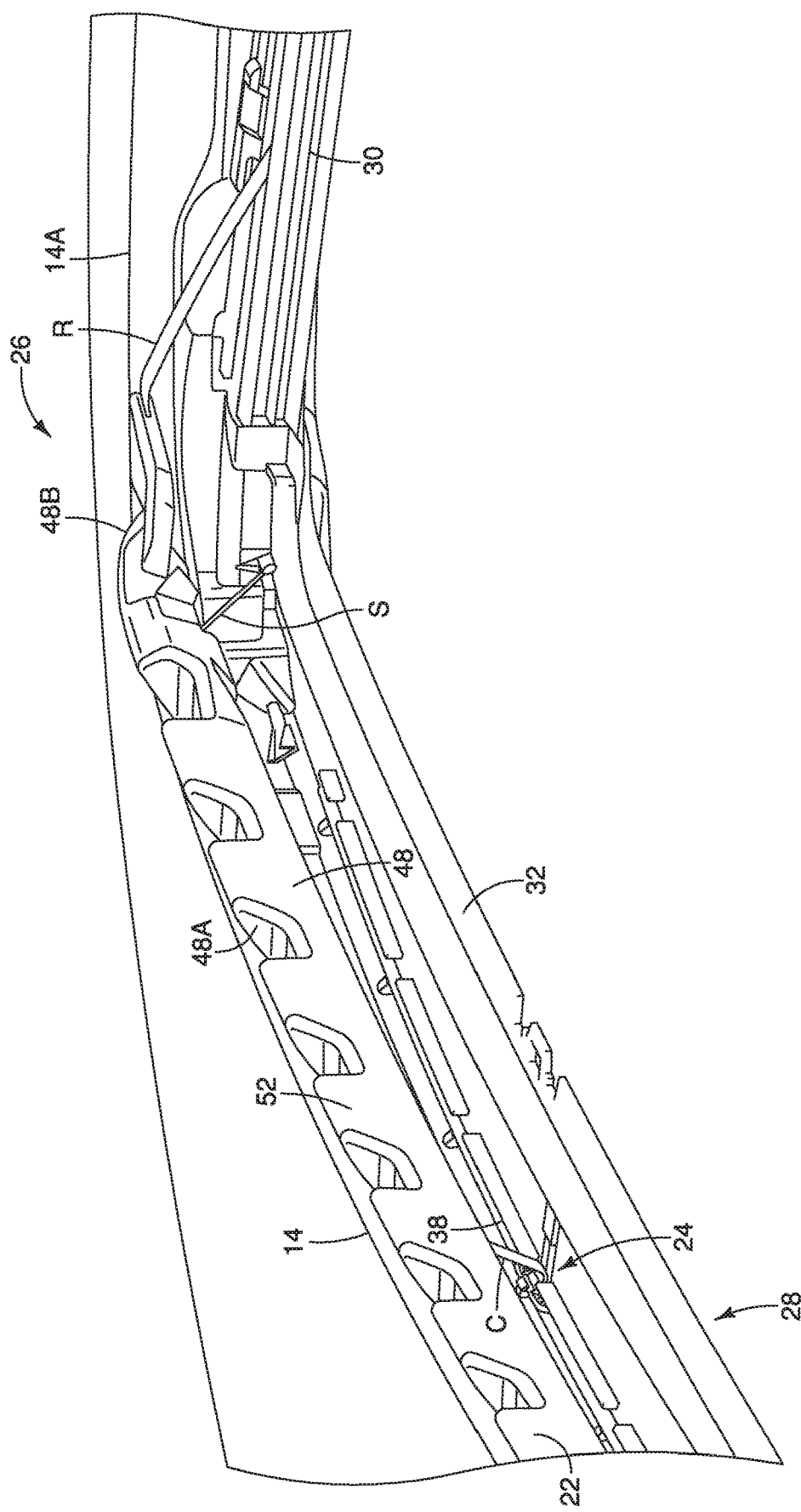
FIG. 4 is a perspective view of a portion of the vehicle sunroof assembly of FIGS. 1 and 2 with the wind deflector in a projected position.

Referring now to FIGS. 2 to 4, the vehicle sunroof assembly 18 will now be discussed. As stated previously, the vehicle sunroof assembly 18 of the illustrated embodiment basically comprises the sunroof frame 20 and the vehicle wind deflector assembly 26. The various components of the vehicle sunroof assembly 18 are provided to improve thermal cycle performance, for squeak prevention, for mold prevention and improve weather durability.

As seen in FIG. 2, the sunroof frame 20 is installed between the vehicle roof 14 and the roof trim panel 16 in a conventional manner. Thus, the sunroof frame 20 is configured to be attached to a vehicle roof component. The sunroof frame 20 can be made of metal, such as steel or aluminum, or any other suitable material used in the vehicle manufacturing processes. The sunroof frame 20 is mounted to the vehicle roof 14 and includes an opening 28C that is aligned with the roof opening 28A and the opening 28B of the roof trim panel 16. In particular, the sunroof frame 20 is fixed to the vehicle roof 14 and sealed to prevent water from leaking into the passenger compartment.

As best seen in FIGS. 2 and 3, the sunroof frame 20 includes a pair of side rails 30, and also a front rail 32 and a rear rail 34 that serve as cross beam components. The side rails 30, front and rear rails 32 and 34 provide structural support for a moveable panel 36, such as a window panel. The moveable panel 36 can include a shade or a glass panel. The moveable panel 36 is moveable to cover and expose the vehicle interior. The sunroof frame 20 further includes corner pieces which include water channels (not shown) for draining water away from the interior of the vehicle V.

As seen in FIGS. 2 to 4, the wind deflector 22 is installed onto the sunroof frame 20. In particular, the wind deflector 22 is attached to the front rail 32. As stated, the wind deflector 22 is moveable with respect to the sunroof frame 20 between the stowed and projected positions. The wind deflector 22 is in the retracted position when the moveable panel 36 is enclosed over the opening 28C of the sunroof frame 20, as best seen in FIG. 2. The wind deflector 22 is stowed under a front edge 14A of the roof opening 28A when in the retracted position. When the moveable panel 36 is opened, the wind deflector 22 partially rotates to project over the front edge 14A of the roof opening 28A of the vehicle roof 14 into the projected position, best seen in FIGS. 1 and 4. The sunroof frame 20 as shown in the illustrated embodiment is manufactured by conventional methods that enables the sunroof frame 20 to be modular. In other words, the components of the sunroof frame 20 are preferably standardized components for easy construction. The specific configuration and size of the sunroof frame 20 can vary for the purposes of the claimed invention. Thus, the vehicle wind deflector assembly 18 of the illustrated embodiment can be implemented with sunroof frames and vehicle roof components of different sizes, dimensions and types.

Figure 5:
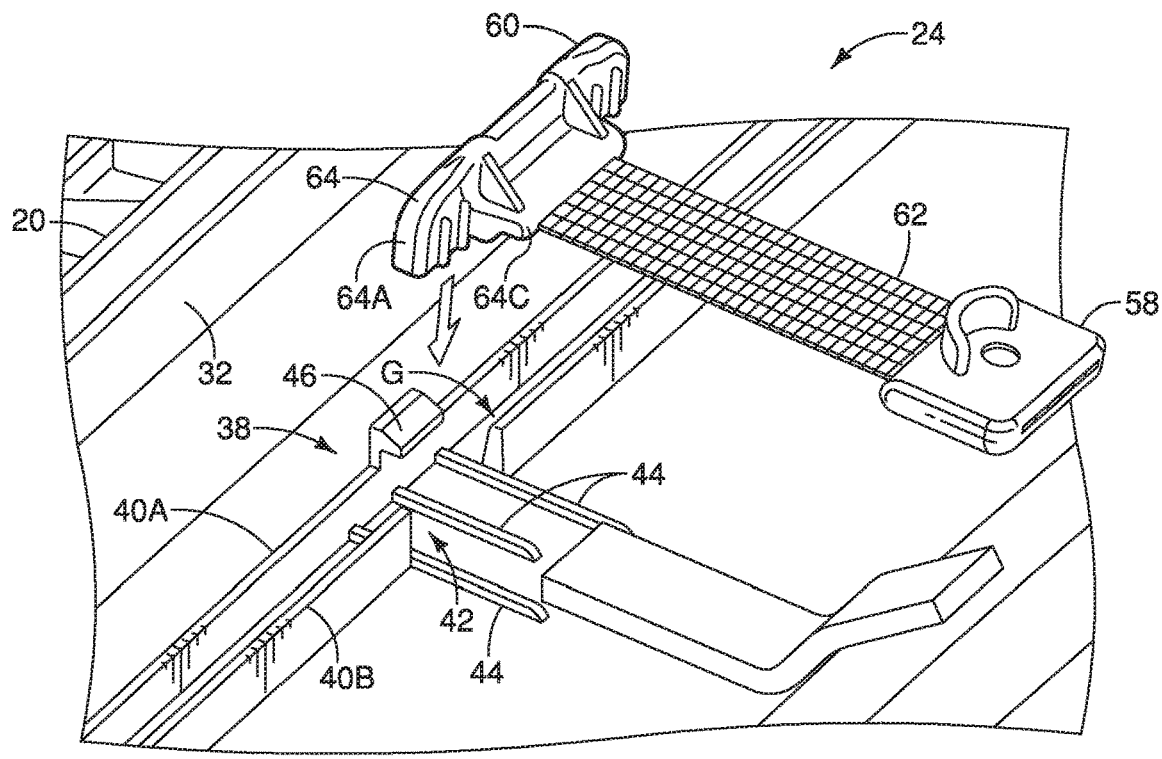
FIG. 5 is a top perspective view of a portion of a sunroof frame of the vehicle sunroof assembly and a tether prior to installation to the sunroof frame.
Figure 6:
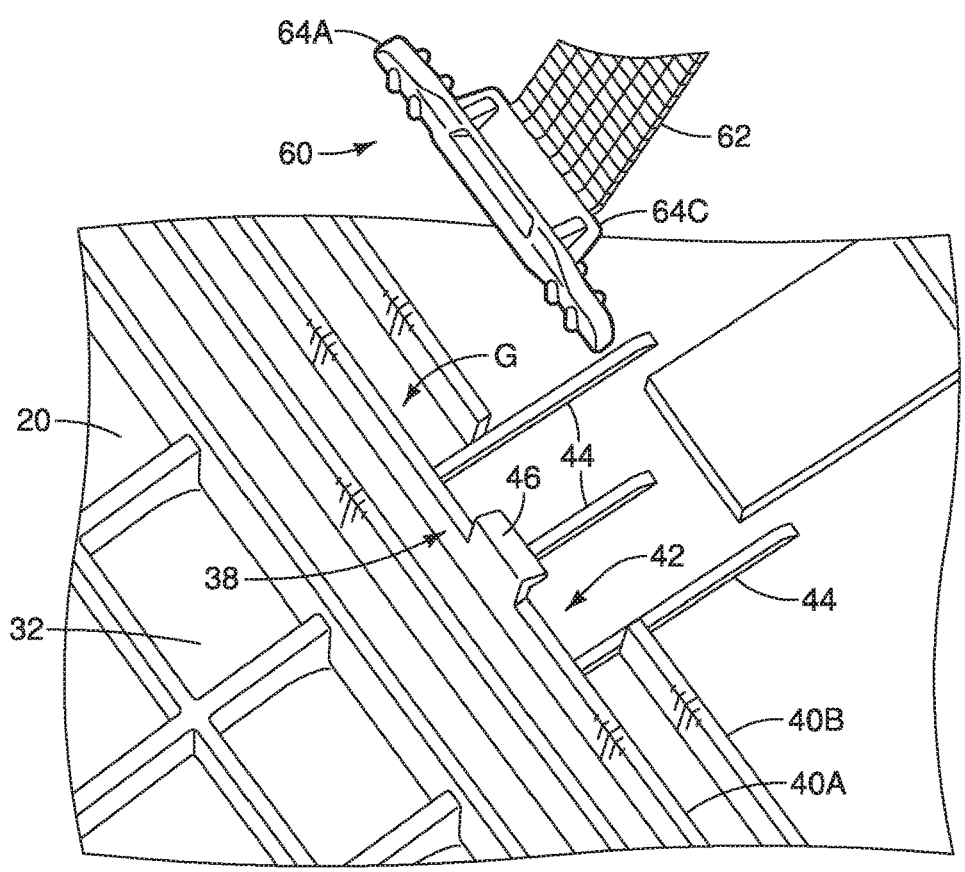
FIG. 6 is another top perspective view of the portion of the sunroof frame of FIG. 5 and the tether prior to installation to the sunroof frame.

As best illustrated in FIGS. 3 and 4, the sunroof frame 20 includes a tether installation area 38 on which the tether 24 is installed. In particular, the front rail 32 includes the tether installation area 38. Preferably, as will be further discussed below, the tether installation area 38 is preferably located in a centered or middle section of the front rail 32 that is substantially equidistant between the side rails 30 of the sunroof frame 20. Referring to FIGS. 5 and 6, the tether installation area 38 has one or more abutments that define a groove G. In particular, the abutments are formed by a pair of sidewalls 40A and 40B that define the groove G. As seen in FIG. 4, the sidewalls 40A and 40B extend laterally along the front rail 32 of the sunroof frame 20. One of the pair of sidewalls 40A and 40B has a gap 42 leading to a plurality of ribs 44. As shown in FIGS. 5 and 6, the sidewall 40B includes the gap 42. The tether installation area 38 further includes the ribs 44 that are located adjacent to the sidewalls 40A and 40B. The ribs 44 are configured to prevent rattling or vibration of the tether 24 on the sunroof frame 20 once the tether 24 is attached. The sidewall 40A includes a clasp 46 that snap-fittedly attaches to the tether 24, as will be further discussed below.

The vehicle wind deflector assembly 26 will now be discussed. The vehicle wind deflector assembly 26 includes the wind deflector 22 and the tether 24. Referring to FIGS. 3 and 4, the vehicle wind deflector assembly 26 optionally further includes a pair of attachment arms R and a pair of biasing springs S. The attachment arms R moveably attach the wind deflector 22 to the sunroof frame 20 between the stowed and projected positions. The attachment arms R are rigid materials, preferably made of metal. The attachment arms R can be fixedly or integrally attached to the deflector and then subsequently installed into the sunroof frame 20. Preferably, the attachment arms R fixedly attach the wind deflector 22 to the side rails 30 at about the lateral ends 48B of the wind deflector 22. As best seen in FIG. 4, each of the attachment arms R attach the wind deflector 22 to one of the side rails 30 at a lateral end. Each of the biasing springs S are preferably located within the vicinity of one of the attachment arms R. The attachment arms R are not critical to the claimed invention and can vary in size, dimension and configuration.

The biasing springs S are connected to the wind deflector 22 and the sunroof frame 20 to bias the wind deflector 22 into the projected position. Thus, the wind deflector 22 is spring loaded upwards into the projected position. The wind deflector 22 moves into the projected position when the moveable panel 36 opens the roof opening 28A and the tether 24 holds the wind deflector 22 at a preferred height. In the illustrated embodiment, the biasing springs S are illustrated as torsion springs having a first end contacting the wind deflector 22 and a second end contacting the sunroof frame 20. However, it will be apparent to those skilled in the vehicle field from this disclosure that the biasing springs S can be other types of springs as appropriate or desired.

The wind deflector 22 will now be discussed in more detail. The wind deflector 22 includes an elongated deflection body 48A that is to be installed to the sunroof frame 20. Preferably, the elongated deflection body 48A extends substantially along an entire longitudinal length of the front rail 32. As best seen in FIG. 3, the elongated deflection body 48A includes alternate sections of different heights extending along an upper edge 48A of the elongated deflection body 48A. The wind deflector 22 is constructed to deflect air passing between the alternating sections and into the openings 28A, 28B and 28C. In the illustrated embodiment, the wind deflector 22 is preferably a rigid wind deflector 22 that is made of a sturdy, lightweight material, preferably plastic. The wind deflector 22 can be provided with a vehicle having a sliding sunroof, a pivoting sunroof, or a sliding and pivoting sunroof. Further, the wind deflector 22 and the tether 24 of the illustrated embodiment can be utilized with a manually operated sunroof or a power sunroof.

The elongated deflection body 48 has a pair of lateral ends 48B. Each of the attachment arms R are preferably disposed in the vicinity of or adjacent to one of the lateral ends 48B of the elongated deflection body 48 to attach the wind deflector 22 to the sunroof frame 20. Preferably, as best seen in FIG. 3, the tether 24 is attached to a middle section M of the elongated deflection body 48. In the illustrated embodiment, the middle section M of the elongated deflection body 48 is defined as a length that is a center ⅓ length of the entire longitudinal length of the elongated deflection body 48. More preferably, in the illustrated embodiment, the tether 24 is attached to a center location C of the elongated deflection body 48 that is equidistant from the pair of lateral ends 48B. Thus, the tether 24 is substantially centered along the wind deflector 22 when installed to the wind deflector 22.

As best seen in FIGS. 4 and 9 to 12, the elongated deflection body 48A further includes a roof facing side 50, an interior facing side 52 and a frame facing side 54 connecting the roof facing side 50 and the interior facing side 52. When the wind deflector 22 is in the stowed position, the roof facing side 50 faces the vehicle roof 14 and the interior facing side 52 faces the vehicle interior. When the wind deflector 22 is in the projected position, the roof facing side 50 faces a car forward direction and the interior facing side 52 faces a car rearward direction, as shown in FIG. 4. As seen in FIGS. 9 to 12, the frame facing side 54 includes a tether attachment area 56 on which the tether 24 is attached. The tether attachment area 56 is configured for a fastener F connection between the tether 24 and the wind deflector 22. In particular, the tether attachment area 56 includes a fastener receiving hole 56A configured to receive a fastener F, as will be further discussed below.

Typically, the tether 24 is provided to the wind deflector 22 and then the wind deflector 22 is installed on the sunroof frame 20 and attached thereon by the attachment arms R and the tether 24. For ease of installation, the tether 24 is fixedly installed onto the wind detlector 22 and then detachably installed onto the sunroof frame 20 to attach the wind deflector 22 to the sunroof frame 20. Preferably, in the illustrated embodiment, the tether 24 is fixedly installed onto the wind deflector 22 by a fastener F connection and the tether 24 is detachably installed onto the wind deflector 22 by a fastenerless connection. However, it will be apparent to those skilled in the vehicle field from this disclosure that the tether 24 can be installed to the wind deflector 22 and the sunroof frame 20 by only fastener connections or by only fastenerlecss connections. Thus, the tether 24 is fixedly connected to at least one of the wind deflector 22 and the sunroof frame 20.

Figure 8:
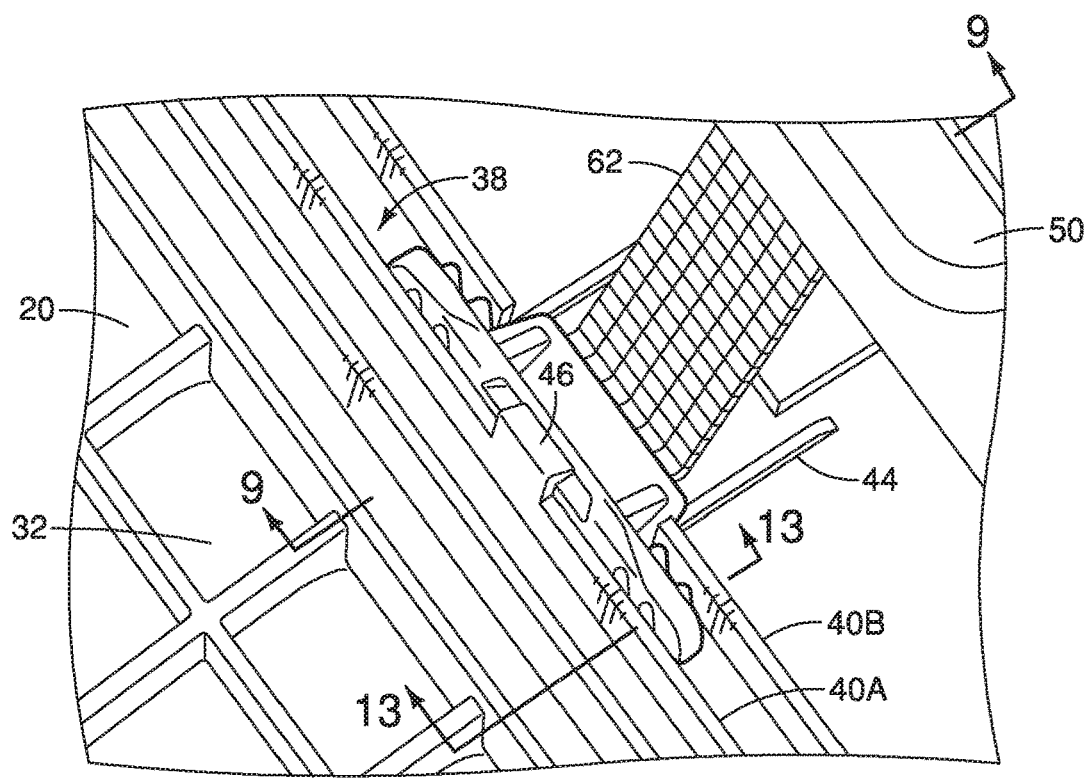
FIG. 8 is the top perspective view of the portion of the sunroof frame that is illustrated in FIG. 6 with the tether installed.
Figure 9:
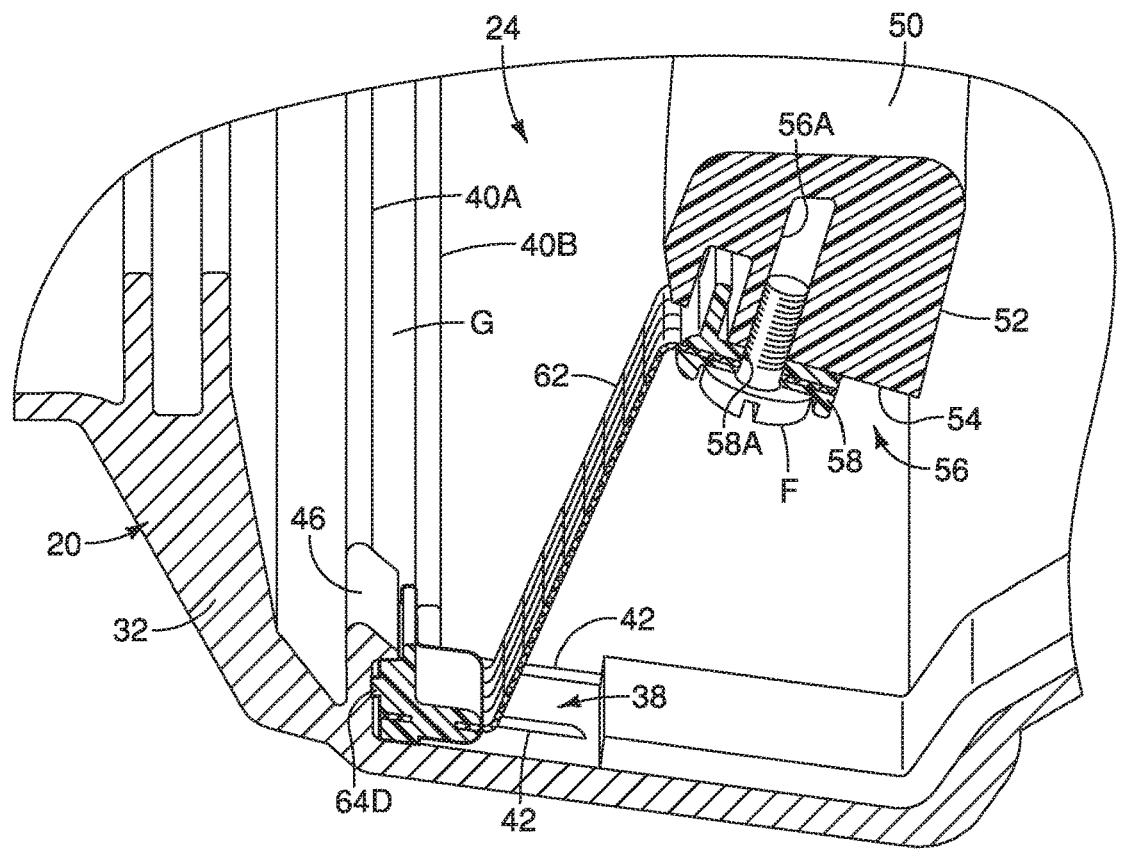
FIG. 9 is a cross-sectional view of the tether attached to the sunroof frame and the wind deflector as taken along section line 9-9 of FIG. 8.
Figure 10:
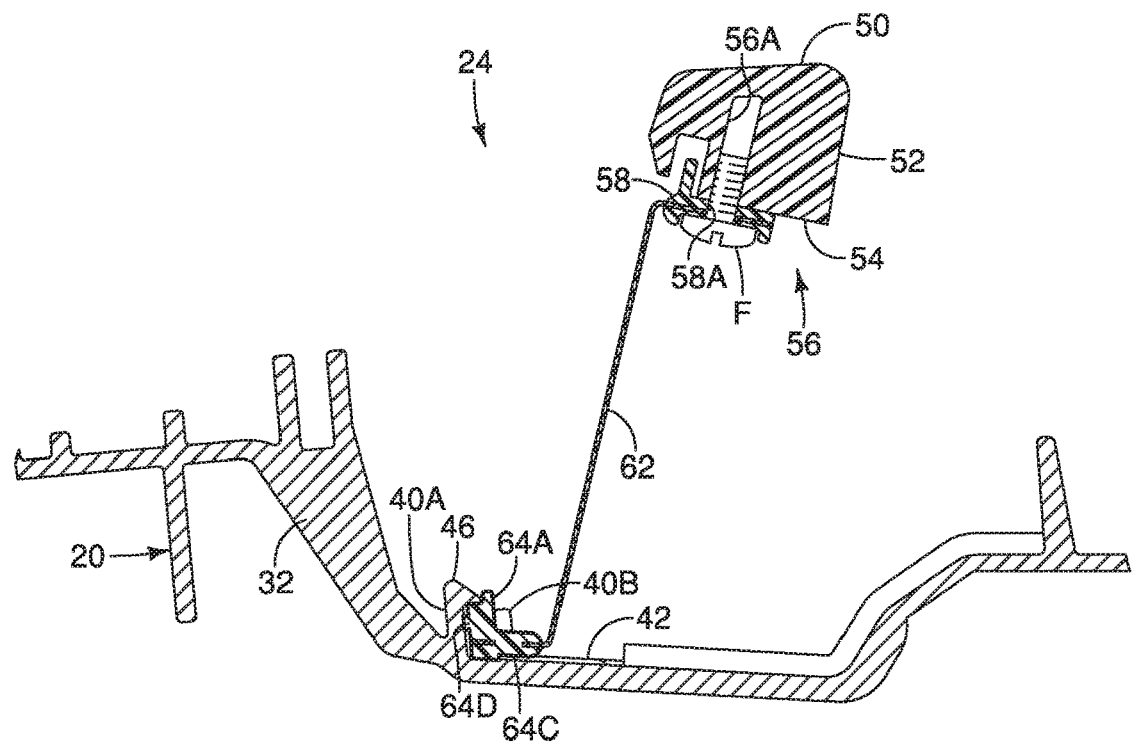
FIG. 10 is another cross-sectional view of the tether attached to the sunroof frame and the wind deflector with the tether in an extended position.
Figure 11:
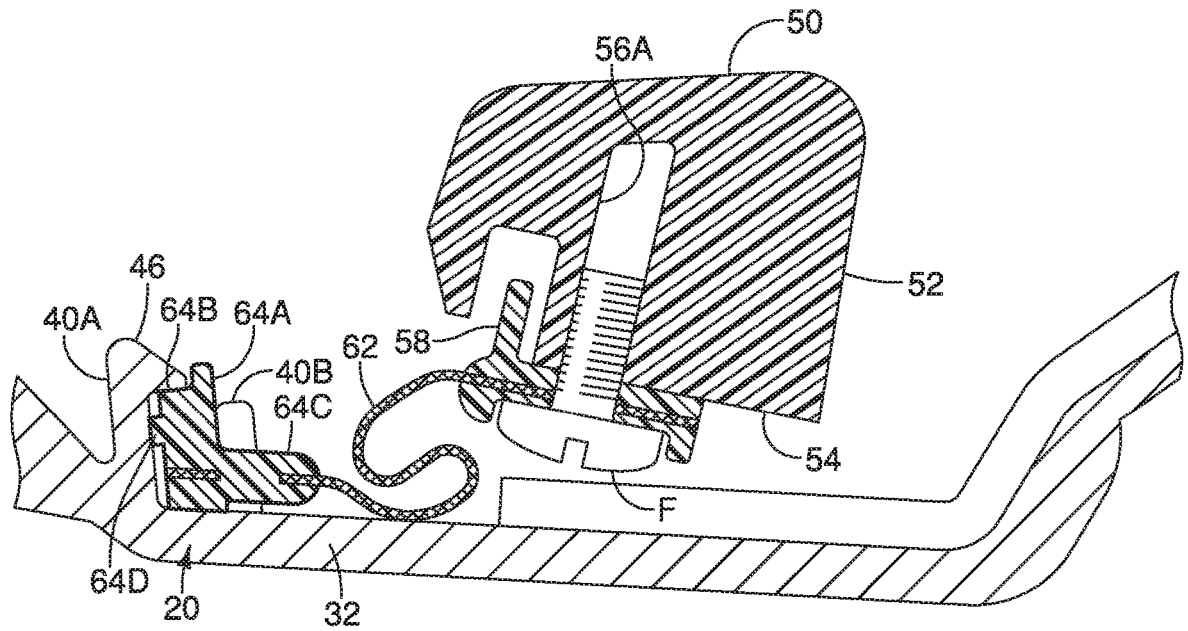
FIG. 11 is a cross-sectional view of the tether attached to the sunroof frame and the wind deflector similar to FIG. 10 with the tether in a retracted position.
Figure 12:
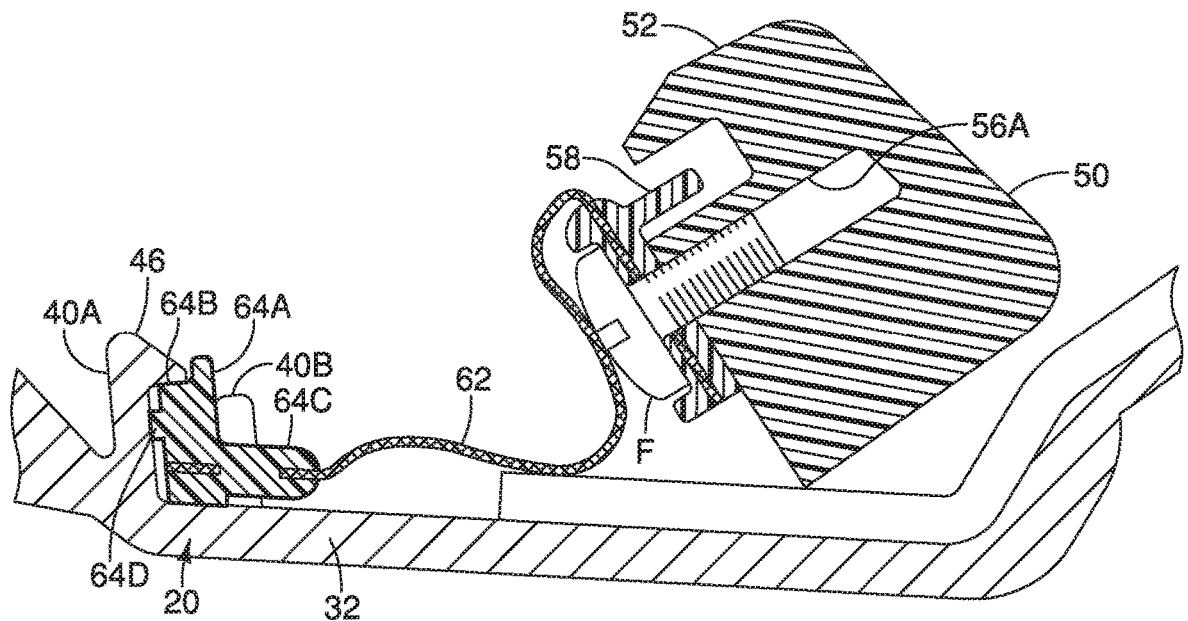
FIG. 12 is another cross-sectional view of the tether attached to the sunroof frame and the wind deflector similar to FIGS. 10 and 11 with the tether in a more retracted position.

The tether 24 will now be further discussed with reference to FIGS. 5 to 12. The tether 24 moveably attaches the wind deflector 22 to the sunroof frame 20 between the stowed and projected positions. The tether 24 is retracted when the wind deflector 22 is in the stowed position (FIGS. 11 and 12). The tether 24 is extended when the wind deflector 22 is in the projected position (FIGS. 9 and 10).

In conventional wind deflector 22 assemblies, when the sunroof is open, the wind deflector 22 is projected above the vehicle roof 14 to an undesirable position. Typically, as a conventional wind deflector 22 is biased into the projected position, a conventional wind deflector can project over a vehicle roof at a height that is greater than desirable. The tether 24 is thus provided in the illustrated embodiment to help maintain the amount that the wind deflector 22 projects over the vehicle roof 14. For example, the tether 24 can be sized and dimensioned to hold the wind deflector 22 at approximately 9 to 10 millimeters over the vehicle roof 14. Preferably the tether 24 is sized and dimensioned to hold the wind deflector 22 such that the upper edge 48A of the wind deflector 22 is approximately 9.7 millimeters in height above the vehicle roof 14. The tether 24 is also provided to hold the wind deflector 22 in a steady position, thereby decreasing vibration of the wind deflector 22 when the vehicle V is in use.

The tether 24 has a deflector attachment part 58, a frame attachment part 60 and a connecting line 62. The connecting line 62 connects the deflector attachment part 58 and the frame attachment part 60. The connecting line 62 is disposed between the frame attachment part 60 and the deflector attachment part 58. In particular, the tether 24 is attached to the wind deflector 22 at the deflector attachment part 58 and is connected to the sunroof frame 20 at the frame attachment part 60. The connecting line 62 is a non-rigid flexible line that enables movement of the wind deflector 22 between the stowed and projected positions.

As stated, the tether 24 and the wind deflector 22 are connected by a fastener F connection. In other words, the tether 24 is fixedly connected to the wind deflector 22 by a fastener F. Thus, in the illustrated embodiment, the vehicle wind deflector assembly 26 further comprises at least one fastener F. Also, as previously stated, the tether 24 is detachably connected to the sunroof frame 20 by a fastenerless connection. Thus, in the illustrated embodiment, one of the frame attachment part 60 and the deflector attachment part 58 includes a non-fastener connection. The other of the frame attachment part 60 and the deflector attachment part 58 includes a fastener receiving bore 58A. Preferably, at least one of the frame attachment part 60 and the deflector attachment part 58 includes the fastener receiving bore 58A. In this way, the tether 24 is detachably connected to at least one of the wind deflector 22 and the sunroof frame 20.

The deflector attachment part 58 and the frame attachment part 60 are rigid members constructed for durability and weight reduction. Preferably, the deflector attachment part 58 and the frame attachment part 60 are constructed of plastic such as polybutylene terephthalate. In the illustrated embodiment, the deflector attachment part 58 and the frame attachment part 60 are individually one-piece molded members.

The connecting line 62 of the tether 24 is a non-rigid or flexible member. Alternatively speaking, the connecting line 62 is defined by a non-rigid material. In the illustrated embodiment, the connecting line 62 of the tether 24 is a fabric strap. Preferably, the connecting line 62 is constructed of a sturdy, fabric mesh such as polyester (PES). Thus, the connecting line 62 of the tether 24 includes fabric. The connecting line 62 can be constructed to have various lengths to achieve a desired height of the wind deflector 22 in the projected position. The frame attachment part 60 and the deflector attachment part 58 are fixedly attached to the connecting line 62. In particular, the frame attachment part 60 and the deflector attachment part 58 are ovennolded to the connecting line 62.

The tether 24 is anchored to the sunroof frame 20 by the frame attachment part 60. Thus, in the illustrated embodiment, at least one of the frame attachment part 60 and the deflector attachment part 58 includes an anchor 64. As best seen in FIGS. 5 to 9, the frame attachment part 60 anchors the tether 24 and the wind deflector 22 to the sunroof frame 20. Alternatively speaking, the frame attachment part 60 includes the anchor 64 that is configured to be attached to the vehicle roof component. The anchor 64 includes a backing 64A. The backing 64A includes a user operating portion 64B configured for a user's finger engagement to attach and detach the tether 24 from the sunroof frame 20. As shown, the anchor 64 further includes a protrusion 64C that extends from the backing 64A. The protrusion 64C extends from the backing 64A and is disposed in the gap 42 of the tether attachment area 56. The anchor 64 further includes a pair of strengthening portions 64E extending between the backing 64A and the protrusion 64C for strengthening connection between the connecting line 62 to the anchor 64.

Figure 7:
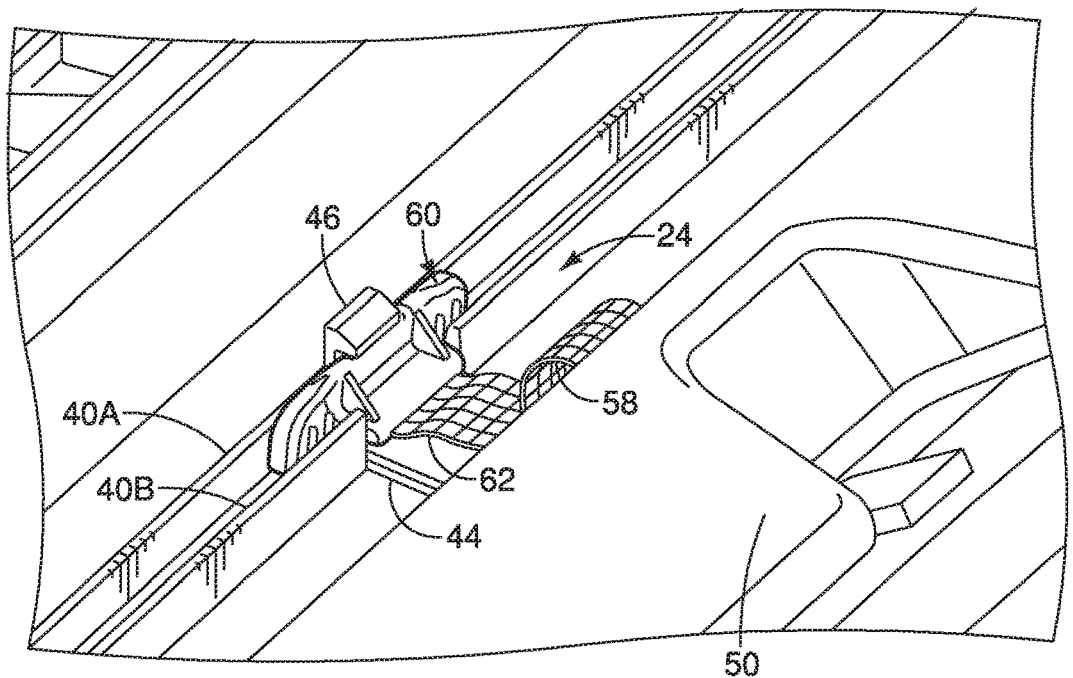
FIG. 7 is the top perspective view of the portion of the sunroof frame that is illustrated in FIG. 5 with the tether installed.
Figure 13:
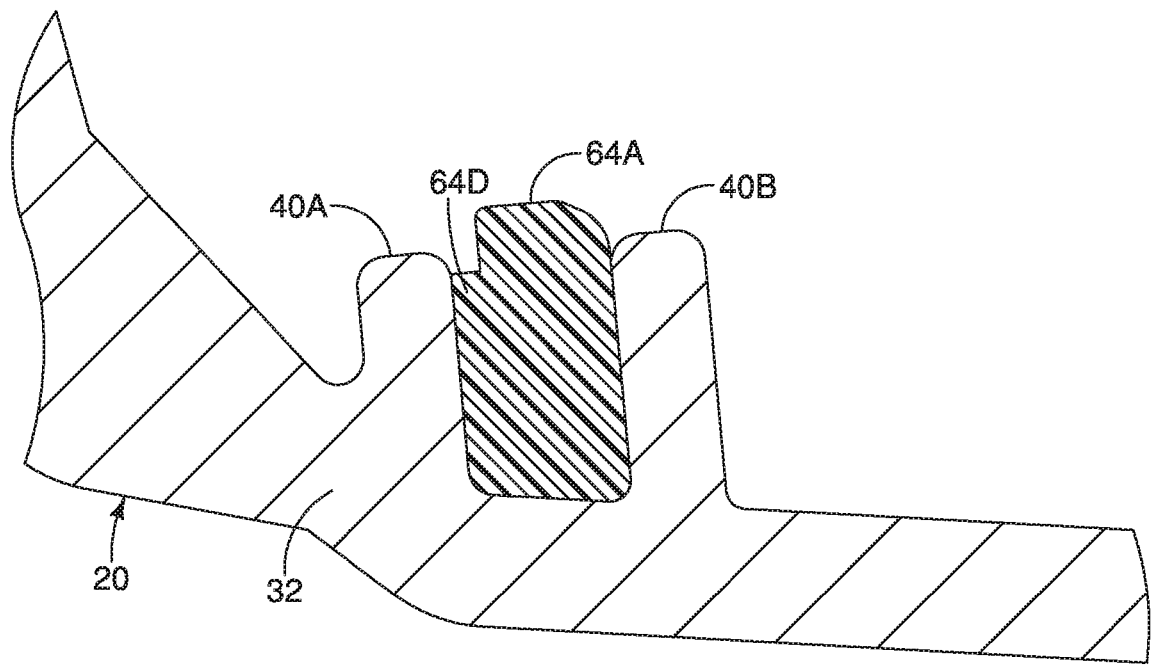
FIG. 13 is a cross-sectional view of the tether attached to the sunroof frame taken along section line 13-13 of FIG. 8.

As seen in FIGS. 6 and 7, the backing 64A is disposed in the channel G of the tether attachment area 56. Preferably, the protrusion 64C contacts the ribs 44 of the tether attachment area 56 of the sunroof frame 20 to prevent rattling or vibration of the tether 24 during use. As best seen in FIGS. 5, 6 and 12, the anchor 64 includes a plurality of ribs 64D disposed on the backing 64A. In other words, the backing 64A includes a plurality of ribs 44 that abut the pair of sidewalls 40A and 40B, as shown in FIGS. 8 and 13. The ribs 64D help ensure a secure fit between the anchor 64 and the tether attachment area 56 of the sunroof frame 20 by helping to prevent rattling and vibration during use of the vehicle V. In other words, the ribs 64D abut the sidewalls 40A and 40B of the sunroof frame 20 to secure the backing 64A to the vehicle roof 14 component. Therefore, in the illustrated embodiment, the backing 64A is configured to be received by the vehicle roof component and the protrusion 64C anchors the connecting line 62 to the vehicle roof component.

In the illustrated embodiment, the tether 24 is attached to the sunroof frame 20 at the frame attachment part 60. The frame attachment part 60 clips into the tether installation area 38 of the sunroof frame 20. As stated, the attachment between the frame attachment part 60 and the sunroof frame 20 is a removeable or a detachable connection. More specifically, the attachment between the frame attachment part 60 and the sunroof frame 20 is a fastenerless connection that does not require the use of a separate fastener (e.g., a bolt, screw, rivet, etc.). Preferably, the frame attachment part 60 is clipped to the sunroof frame 20 by a snap fit connection between the anchor 64 and the sidewalls 40A and 40B of the tether installation area 38. Specifically, the backing 64A is connected to the channel G and the clasp 46 of the sidewall 40A is snap fitted over the user engagement portion of the backing 64A.

Figure 14:
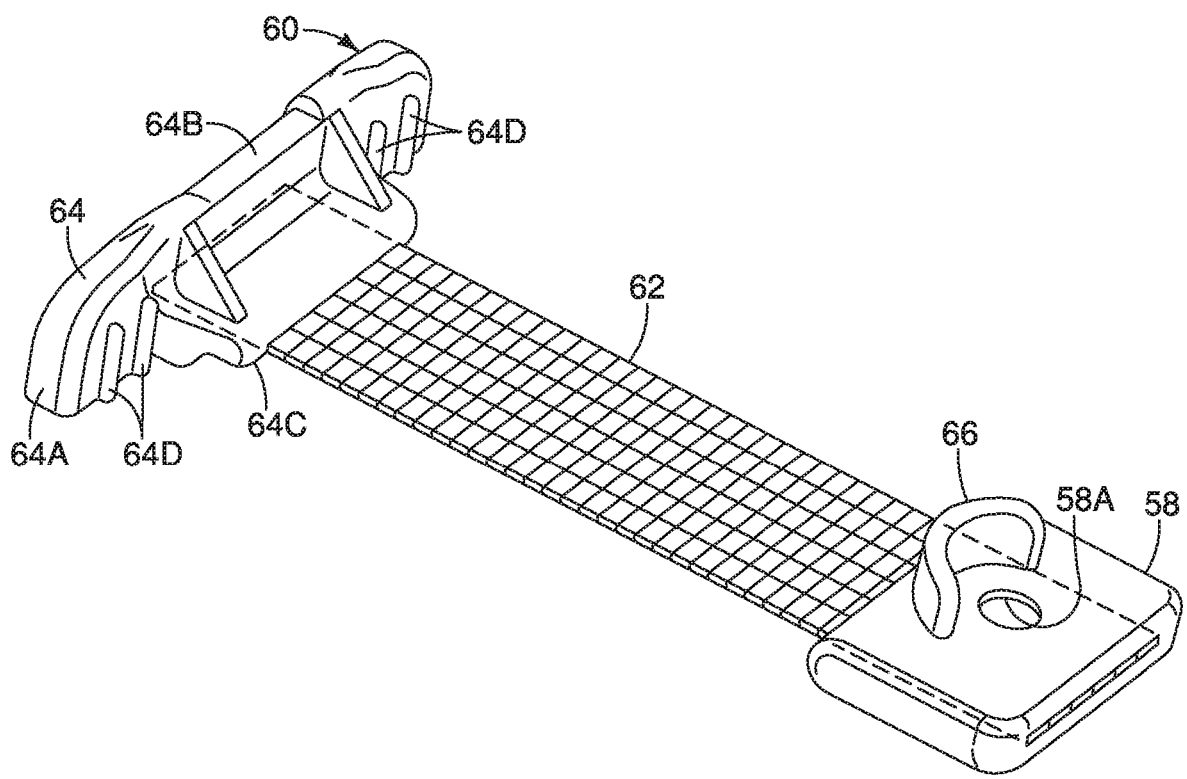
FIG. 14 is a top perspective view of the tether.

The deflector attachment part 58 is attached to the wind deflector 22 and attaches the tether 24 to the wind deflector 22. The deflector attachment part 58 includes the fastener receiving bore 58A. As stated, the deflector attachment part 58 is attached to the wind deflector 22 by the fastener F. Thus, the vehicle wind deflector assembly 26 further comprises the fastener F that is disposed through the fastener receiving bore 58A. The fastener receiving bore 58A is aligned with the fastener receiving hole 56A of the wind deflector 22. The fastener F is disposed through the fastener receiving bore 58A of the tether 24 and the fastener receiving hole 56A of the wind deflector 22 to fixedly attach the tether 24 to the wind deflector 22. The deflector attachment part 58 further includes an anti-rotational structure 66 disposed adjacent to the fastener receiving bore 58A, best seen in FIG. 14. The anti-rotational structure 66 is configured to prevent rotation of the fastener F once installed into the tether 24 and the wind deflector 22. Thus, the anti-rotational structure 66 prevents the fastener F from coming loose or dislodging. In the illustrated embodiment, the anti-rotational structure 66 is a substantially semi-circular side wall that is disposed adjacent to the fastener receiving bore 58A of the deflector attachment part 58.

GENERAL INTERPRETATION OF TERMS

In understanding the scope of the present invention, the term "comprising" and its derivatives, as used herein, are intended to be open ended terms that specify the presence of the stated features, elements, components, groups, etc., but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle wind deflector assembly. Accordingly, these terms, as utilized to describe the present invention should be interpreted relative to a vehicle equipped with the vehicle wind deflector assembly.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle wind deflector assembly comprising:
   a wind deflector; and
   a tether having a deflector attachment part including a fastener receiving bore for receiving a fastener that attaches the fastener to the wind deflector, a frame attachment part configured to be detachably clipped by a snap fit clasp to a vehicle roof component, and a connecting line disposed between the frame attachment part and the deflector attachment part.

2. The vehicle wind deflector assembly as claimed in claim 1, wherein
   the connecting line of the tether is a fabric strap.

3. The wind deflector assembly as claimed in claim 2, wherein
   the frame attachment part includes a rigid anchor that is configured to be detachably clipped to the vehicle roof component.

4. The wind deflector assembly as claimed in claim 3, wherein
   the anchor includes a backing and a protrusion extending from the backing, the backing being configured to be received in a channel of the vehicle roof component and the protrusion anchoring the connecting line to the vehicle roof component.

5. The wind deflector assembly as claimed in claim 4, wherein
   the anchor includes a plurality of ribs disposed on a surface of the backing to secure the backing to the vehicle roof component.

6. The wind deflector assembly as claimed in claim 2, further comprising
   the fastener disposed through the fastener receiving bore of the tether and a receiving hole of the wind deflector to fixedly attach the tether to the wind deflector.

7. The wind deflector assembly as claimed in claim 1, wherein
   the frame attachment part and the deflector attachment part includes an anchor for anchoring the tether to the vehicle roof component.

8. The vehicle wind deflector assembly as claimed in claim 1, wherein
   the frame attachment part and the deflector attachment part are overmolded to the connecting line.

9. A vehicle sunroof assembly comprising the vehicle wind deflector assembly as claimed in claim 1, and further comprising:
   a sunroof frame having an opening for a window panel, the wind deflector being moveably installed onto the sunroof frame between a stowed position and a projected position; and
   the tether being attached to the sunroof frame, the tether being retracted when the deflector is in the stowed position and the tether being extended when the deflector is in the projected position.

10. The vehicle sunroof assembly as claimed in claim 9, wherein
    the sunroof frame includes a tether installation area, the tether installation area having one or more abutments that define a channel on the sunroof frame.

11. A vehicle sunroof assembly comprising:
    a wind deflector;
    a tether having a deflector attachment part attached to the wind deflector, a frame attachment part configured to be detachably clipped attached to a vehicle roof component, and a connecting line disposed between the frame attachment part and the deflector attachment part; and
    a sunroof frame having an opening for a window panel, the sunroof frame includes a tether installation area, the tether installation area having one or more abutments that define a channel on the sunroof frame, the wind deflector being moveably installed onto the sunroof frame between a stowed position and a projected position,
    the tether being attached to the sunroof frame, the tether being retracted when the deflector is in the stowed position and the tether being extended when the deflector is in the projected position the sunroof frame including a pair of sidewalls that form the abutments to define the channel, one of the pair of sidewalls having a gap thia receives the frame attachment part therethrough.

12. The vehicle sunroof assembly as claimed in claim 11, wherein
    the frame attachment part includes an anchor having a backing that disposed in the channel and a protrusion extending from the backing and disposed in the gap, the connecting line being connected to the protrusion.

13. The vehicle sunroof assembly as claimed in claim 12, wherein
    the other of the pair of sidewalls having a clasp that snap-fittedly attaches to the backing.

14. The vehicle sunroof assembly as claimed in claim 13, wherein
    the backing includes a plurality of ribs that abut the pair of sidewalls.

15. The vehicle sunroof assembly as claimed in claim 9, wherein
    the connecting line of the tether is a fabric strap.

16. The vehicle sunroof assembly as claimed in claim 9, wherein
    the frame attachment part includes an anchor that is configured to be attached to the vehicle roof component.

17. The wind deflector assembly as claimed in claim 9, wherein
    one of the frame attachment part and the deflector attachment part includes a connection that does not require an external fastener and the other and the frame attachment part and the deflector attachment part includes a fastener receiving bore for receiving the fastener.

18. The vehicle wind deflector assembly as claimed in claim 11, wherein
    the pair of sidewalls is separated by a space that defines a channel extending on the sunroof frame, the frame attachment part being clipped in the channel.

19. The vehicle wind deflector assembly as claimed in claim 18, wherein the deflector attachment part and the frame attachment part are rigid, the connecting line is deformable.

* * * * *